United States Patent
Chen et al.

(10) Patent No.: US 10,823,256 B2
(45) Date of Patent: Nov. 3, 2020

(54) CABLE PROTECTION CHAIN

(71) Applicant: QUANTA COMPUTER INC., Taoyuan (TW)

(72) Inventors: Chao-Jung Chen, Taoyuan (TW); Hung-Yen Ke, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 295 days.

(21) Appl. No.: 15/960,943

(22) Filed: Apr. 24, 2018

(65) Prior Publication Data

US 2019/0219135 A1    Jul. 18, 2019

Related U.S. Application Data

(60) Provisional application No. 62/616,630, filed on Jan. 12, 2018.

(51) Int. Cl.
*F16G 13/16* (2006.01)
*H02G 11/00* (2006.01)
*H02G 3/04* (2006.01)

(52) U.S. Cl.
CPC ........... *F16G 13/16* (2013.01); *H02G 11/006* (2013.01); *H02G 3/0418* (2013.01); *H02G 3/0475* (2013.01)

(58) Field of Classification Search
CPC .......... F16G 15/00; F16G 15/12; F16G 15/02; F16G 15/04; F16G 13/00; F16G 13/18; F16G 13/16; H02G 11/006; H02G 3/0475
See application file for complete search history.

(56) References Cited

U.S. PATENT DOCUMENTS

| | | | | |
|---|---|---|---|---|
| 6,167,689 B1 * | 1/2001 | Heidrich | ................. | F16G 13/16 248/49 |
| 7,290,384 B2 * | 11/2007 | Weber | ..................... | F16G 13/16 248/49 |
| 8,674,222 B2 * | 3/2014 | Hsieh | ..................... | F16G 13/16 174/68.1 |
| 8,720,178 B2 * | 5/2014 | Wendig | ................... | F16G 13/16 59/78.1 |

(Continued)

FOREIGN PATENT DOCUMENTS

| DE | 7800098 U1 | 5/1978 |
|---|---|---|
| DE | 3714056 C1 | 8/1998 |

(Continued)

OTHER PUBLICATIONS

JP Office Action for Application No. 2018-247141, dated Sep. 10, 2019, w/ First Office Action Summary.

(Continued)

*Primary Examiner* — Pradeep C Battula
(74) *Attorney, Agent, or Firm* — Nixon Peabody LLP

(57) ABSTRACT

A protective device for a cable in the form of a plurality of interconnected links forming a chain. At least one of the links comprises a retaining element, which may be a C-shaped or an L-shaped element which completes the formation of an enclosed void into which a cable can be inserted for protection. Each link preferably includes two opposed sidewalls connected by a bottom wall and the C-shaped or L-shaped element. When the retaining member is the L-shaped element, the L-shaped element is hingedly connected to one of the opposed sidewalls.

17 Claims, 3 Drawing Sheets

(56) References Cited

U.S. PATENT DOCUMENTS

| | | | |
|---|---|---|---|
| 9,328,795 B2* | 5/2016 | Blase | F16G 13/16 |
| 9,695,910 B2* | 7/2017 | Komiya | F16G 13/16 |
| 10,378,610 B2* | 8/2019 | Jaeker | F16G 13/16 |
| 2003/0145575 A1* | 8/2003 | Mendenhall | F16G 13/16 59/78 |
| 2008/0280717 A1* | 11/2008 | Wehler | F16G 13/16 474/227 |
| 2017/0037985 A1 | 2/2017 | Lin et al. | |
| 2017/0108082 A1* | 4/2017 | Barten | F16G 13/16 |

FOREIGN PATENT DOCUMENTS

| | | |
|---|---|---|
| EP | 1010558 A2 | 6/2000 |
| JP | H1028310 A | 1/1998 |
| JP | 2001514724 A | 9/2001 |
| JP | 2011038545 A | 2/2011 |
| TW | 201111662 A | 4/2011 |
| TW | M427481 U | 4/2012 |
| WO | 9840644 A1 | 9/1998 |
| WO | 2015068636 A | 5/2015 |

OTHER PUBLICATIONS

Extended European Search Report for EP Application No. 18211345.6, dated May 29, 2019.
TW Office Action for Application No. 107137827, dated Jul. 18, 2019, w/ First Office Action Summary.
TW Search Report for Application No. 107137827, dated Jul. 18, 2019, w/ First Office Action.

* cited by examiner

CABLE PROTECTION CHAIN

CROSS-REFERENCE TO RELATED APPLICATIONS

This application claims domestic benefit under 35 U.S.C. § 119 of U.S. Provisional patent application Ser. No. 62/616,630, filed Jan. 12, 2018, the entire disclosure of which is herein incorporated by reference in its entirety.

TECHNICAL FIELD

In order to protect a cable moving within a protective cable chain, a retaining element, such as L-shaped or C-shape parts are provided on a radius area of the cable chain to protect the cable contained therein. Preferably, the retaining element is tethered to the protective cable chain, and in some embodiments, is hingedly connected to the protective cable chain.

BACKGROUND

There is frequently a need to position a cable between parts that are relatively movable with respect to one another. The relatively moving parts may be part of the same machine, may be located on different machines, or may extend between a fixed element and a moving part. In such a case, there is a need to protect the cable from kinking; inadvertent impingement of the cable on one or another of the moving parts; impingement of the cable upon an unrelated part resulting in failure of the cable; or premature failure of the cable due to over flexing of the cable. In such cases, there has been devised a chain protector comprising interconnected chain links into which the cable will rest. The cable can be any type of cable, such as one bearing one or more electrical conductors or optical conductors; and combinations thereof; and may have the conductors arranged in twisted, braided, concentric or other configurations. Generally, the links may comprise two parallel sidewalls having a bottom wall connected to, and spacing the sidewalls from one another, to form a void therebetween. A plurality of similar links may be interconnected so as to form a chain having a continuous void therein. Into this void, the cable is situated so as to be protected on three sides by the two spaced sidewalls and the bottom wall. The chain so formed may be advanced or retracted by driving with a cog or chain gear, as the respectively moving parts which are connected to the cable relatively move in relation to one another, or may just flex without any driving mechanism.

However, the present inventors have discovered that even a cable protected on three sides by a chain formed of interconnected links, is still subject to risk of damage, dislocation from the void, etc. as the links move back and forth; over a cog or other gear, such as a chain gear, etc. As the chain changes shape from a catenary to an axis as the chain, and the cable contained therein, moves, the cable needs to be retained within the protective cable chain.

It is these and other possibilities of damage, excessive wear, and premature failure of the cable that are avoided by the present disclosure.

SUMMARY

In one embodiment, a retaining element, which can take the shape of a C- or an L-shaped element, which is designed to bridge the open end of the two parallel sidewalls of the chain opposite the bottom wall is provided.

In another embodiment, it is desirable to have the retaining element associated with the links that made up the protective cable chain. In such a case, the C- or the L-shaped element is integrally connected to one of the sidewalls by a tether. In other cases, the retaining element, in the form of the L-shaped element is hingedly connected by a living hinge, such that the L-shaped element may be rotated about the living hinge thousands, and up-to hundreds-of-thousands of times, without failure.

In another embodiment, the distal ends of the C-shaped element; or at least one end of the L-shaped element, opposite the hinge side, is provided with an element to interlock the retaining element with one, or both of the sidewalls, so as to remain in a closed, locked position to secure the cable within the void bounded by the two parallel sidewalls, the bottom wall, and the retaining element.

In a still further embodiment of the invention, the link comprises a polymeric material, which is molded to shape, so as to provide the L-shaped element as an integral part of one of the sidewalls.

These and other embodiments and objects of the disclosure will be better understood when read in conjunction with the following detailed description and the appended drawings.

DETAILED DESCRIPTION

Figure 1:
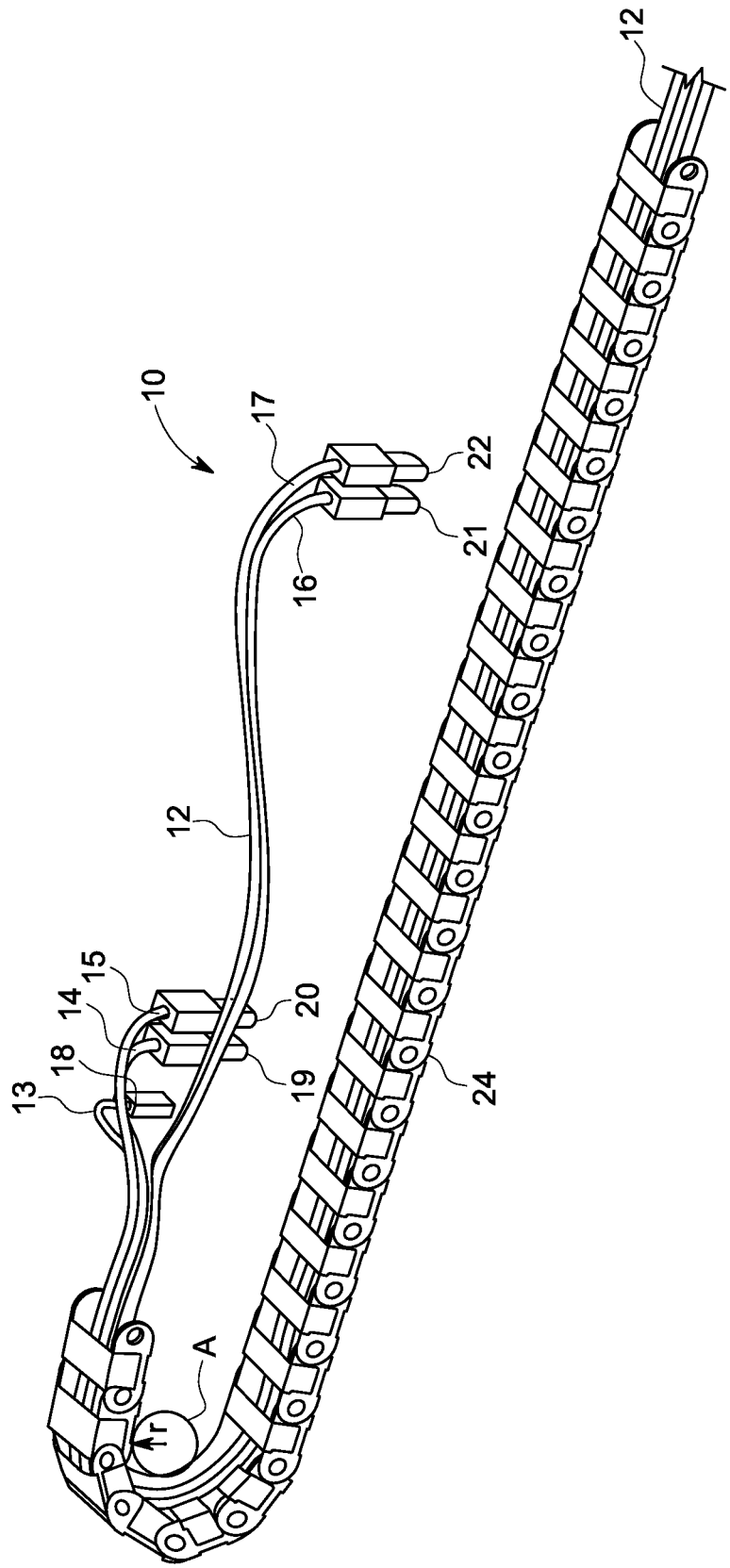
FIG. 1 is a schematic representation of a cable having several conductors, which cable is enclosed by a chain protector.

The present invention is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1 shows the combination of a cable and protective chain 10. Cable 12 is shown with multiple conductors 13, 14, 15, 16 and 17, each terminating in a plug 18, 19, 20, 21 and 22, respectively. This arrangement of the cable 12 is for illustrative purposes only and should not be viewed as limiting. The cable 12 may take other forms, such as having fewer or more conductors, the presence or absence of plugs, sockets, or other terminal endings. The cable 12 may also be formed of electrical conductors, such as metallic wires, optical connectors, for example light pipes, or other forms of optical conductors, and combinations thereof. FIG. 1 also illustrates a cable chain 24, with the cable 12 contained in a void formed by various elements of the cable chain 24. The area A may be formed as a radius. The radius "r" may be about a cog or chain gear (not shown) or a natural radius "r" formed in the absence of a cog or chain gear as when the relative movement of the two parts between which the cable chain and cable contained therein forms such a radius "r".

Figure 2:
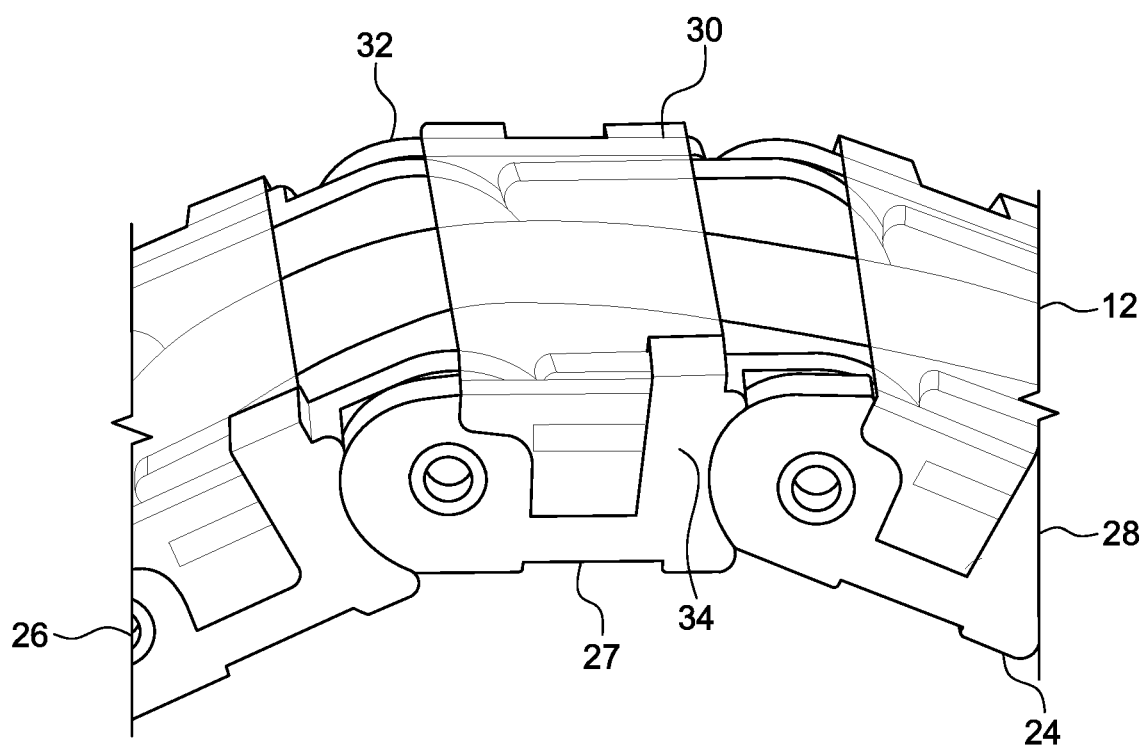
FIG. 2 is an enlarged, schematic view of a portion of FIG. 1 to show detail.

In FIG. 2, which is enlarged to show the details of a portion of the cable chain 24, it can be appreciated that the cable chain 24 is formed from an assembly of individual links, 26, 27, 28, etc., that can form a protective cable chain of any desired length. In FIG. 2, the retaining element is shown as the L-shaped element 30, partially shown in a transparent format, to illustrate its position with regard to sidewalls 32, 34 of link 27. In practice, each link can be formed of metal, plastic, or composite construction. Plastics can be selected from any suitable polymer, such as polypropylene or polyethylene; nylons, such as Nylon 12; as well as other suitable plastics. As metals, iron and its alloys, aluminum and its alloys can be used. While metal, iron and its alloys, and aluminum and its alloys are mentioned, any other suitable metal can be used. It should be understood that while it is preferable that each link comprise a retaining element, such as the L-shaped element 30, it is not required that each link be provided with a retaining element, especially where the cable chain is of extended length.

Figure 3:
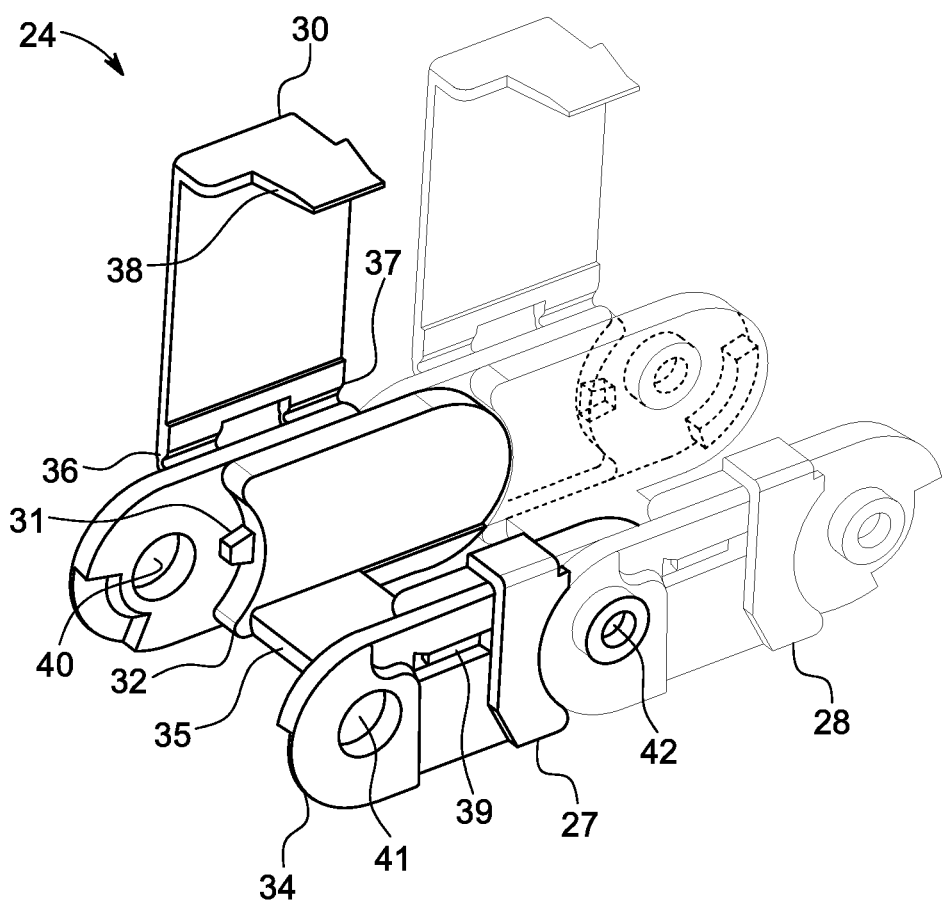
FIG. 3 is an enlarged, schematic view of one complete link with attached L-shaped element, and a dotted line link to show details of the interconnection between links.

FIG. 3 is an enlarged view of a portion of FIG. 2 to show more detail of the link construction. Link 27 comprises two upstanding sidewalls 32, 34 joined together by floor 35. Floor 35 both positions sidewalls 32, 34 in relation to each other, and also positions sidewalls 32, 34 generally orthogonal to the floor. While the cable chain 24 might provide some protection to a cable inserted into a void formed between sidewalls 32, 34 and floor 35, a cable placed therein is prone to damage by not being retained in such void between sidewalls 32, 34 and floor 35. In the embodiment illustrated in FIG. 3, a retaining element, shown as L-shaped element 30, is provided to secure the cable within the void to prevent the possibility of damage to the cable during flexing thereof. The retaining element, illustrated as the L-shaped element 30, may be attached to one of the sidewalls, here 32, so as to be pivotably movable with regard to the sidewall 32 by reason of hinges 36, 37 at the juncture of L-shaped element 30 with the sidewall 32. Hinges 36, 37 are of the so-called "butterfly" hinge design to assure bi-stable pivot action, although other hinge forms may be substituted. If the sidewall 32 and L-shaped element 30 are formed of a molded polymer, the hinges 36, 37 may be integrally formed with the sidewall 32 and L-shaped element 30 into what is known in the art as a "living hinge." A living hinge has an exceptionally long lifespan of thousands, if not hundreds-of-thousands, of rotations before failure. A locking element may be provided at the end of L-shaped element 30 distal to the hinge. Here, locking element 38 is provided as a boss which is designed to interfit into groove 39 on the sidewall 34. When rotated about hinges 36, 37 on the sidewall 32, L-shaped element 30 will lock with the sidewall 34, as shown in transparent portion of FIG. 2 by means of locking element 38 locking into groove 39 on the sidewall 34. It is to be understood that the positions of boss and groove may be interchanged without departing from the teachings of a lock. It should also be understood that alternative elements may be substituted for the boss and groove in order to lock the L-shaped element to the sidewall. The retaining element may also take the form of a C-shaped element, with locking elements on each end of the C-shape so as to lock with each of sidewalls 32 and 34 as the C-shape bridges the open end of sidewalls 32, 34.

When locked, as shown in FIG. 2, the retaining element, for example L-shaped element 30 completes the capture of cable 12 in the void formed between sidewalls 32, 34 on the one hand and floor 35 and L-shaped element 30 on the other hand. Alternatively, the retaining element, in the form of a C-shaped element, can be locked into place with each or sidewalls 32, 34, thereby also capturing cable 12 in the void formed between the opposed sidewalls 32, 34, floor 35 and the opposed retaining element 30. Cable 12 is now safely secured within the cable chain 24 and protected from impingement on the relatively moving parts; or other stationary part during advancement; or retraction of the relatively moving parts; or from premature flexing of the cable; or otherwise lifting of the cable from the cable chain protector.

Holes 40, 41 may be provided in each of sidewalls 32, 34, respectively for the purpose of permitting pins (only one of which is shown) at 42 from an adjacent link to interfit into its respective hole 40, 41 to secure the links together. Pin 42 may be formed of the same types of polymers used to form the individual links. Other manners of linking the individual links may be provided, such as a single pin that engages with each of holes 40, 41. However, the use of a single pin which bridges holes 40, 41 would diminish the area of the void into which the cable 12 must fit. Therefore, it is not preferred. If the individual links 26, 27, 28, etc. are formed of metal, the pins may be formed as rivets. Similarly, L-shaped member 30 may also be formed of metal and in that instance, hinges 36, 37 may comprise ordinary hinge pins. A stopper 31 is provided so as to limit the degree of rotation of each link with its adjacent link, so as to prevent excessive degree of rotation of the cable chain 24 upon itself and thereby preventing damage to the cable 12 contained therein.

It is to be expressly understood that the various embodiments described herein are exemplary only, and not limiting, as those skilled in the art to which this application is directed, will upon reading this disclosure, envision other modifications and embodiments to implement the teaching of this disclosure without the exercise of invention.

We claim:

1. A protective device for a cable, the protective device comprising:
   a cable chain, the cable chain comprising at least two links, at least one link of said at least two links comprising opposed sidewalls;
   the opposed sidewalls each being connected to a floor, which floor both spaces the opposed sidewalls apart and positions the opposed sidewalls orthogonal to the floor;
   the at least one link further comprising an L-shaped retaining element, the L-shaped retaining element bridging the opposed sidewalls in a position opposed to the floor; a first end of the L-shaped retaining element being connected to a first one of the opposed sidewalls with a butterfly hinge, a second end of the L-shaped retaining element being provided with a locking element positioned distally from the butterfly hinge, the L-shaped retaining element being provided with a curvilinear shoulder adjacent the locking element in order to guide the locking element into a position to lock the L-shaped retaining element to a second one of the two opposed sidewalls; and, the opposed sidewalls and the floor and the L-shaped retaining element defining a first void into which a cable may be provided.

2. The protective device for a cable according to claim 1, wherein the locking element comprises at least one element selected from a boss and a groove.

3. The protective device for a cable according to claim 1, further comprising a plurality of links joined together into a cable chain.

4. The protective device for a cable according to claim 1, wherein the protective device comprises a polymer, wherein the butterfly hinge comprises a living hinge.

5. The protective device for a cable according to claim 4, wherein the polymer is one selected from the group consisting of polypropylene and polyethylene.

6. The protective device for a cable according to claim 1, wherein the protective device comprises a metal, wherein the butterfly hinge comprises two hinge pins separated by a second void between the hinge pins.

7. A system comprising the combination of a protective device for a cable according to claim 1 and a cable, the cable being positioned in the first void.

8. The system comprising the combination of a protective device for a cable and a cable according to claim 7, wherein the cable is one selected from the group consisting of electrically conductive cable and light conductive cables, and combinations thereof.

9. The system comprising the combination of a protective device for a cable and a cable according to claim 8, further comprising terminal connections on at least one end of the cable.

10. The system comprising the combination of the protective device for a cable and a cable of claim 8, further comprising at least two relatively moving parts interconnected by the protective device for a cable and cable.

11. The system comprising the combination of the protective device for a cable and cable of claim 7, further comprising at least two relatively moving parts interconnected by the protective device for a cable and cable.

12. A protective device for a cable, the protective device comprising:

a cable chain, the cable chain comprising at least two links, at least one link of said at least two links comprising opposed sidewalls;

the opposed sidewalls each being connected to a floor, which floor both spaces the opposed sidewalls apart and positions the opposed sidewalls orthogonal to the floor;

the at least one link further comprising an L-shaped retaining element, the L-shaped retaining element bridging the opposed sidewalls in a position opposed to the floor, a first end of the L-shaped retaining element being connected to a first one of the opposed sidewalls with a butterfly hinge, a second end of the L-shaped retaining element being provided with a locking element positioned distally from the butterfly hinge, the L-shaped retaining element being provided with a curvilinear shoulder adjacent the locking element in order to guide the locking element into a position to lock the L-shaped retaining element to a second one of the opposed sidewalls; and, the opposed sidewalls and the floor and the L-shaped retaining element defining a first void into which a cable may be provided;

wherein the opposed sidewalls, the floor, and the L-shaped retaining element are all integral.

13. The protective device for a cable according to claim 12, wherein the opposed sidewalls, the floor and the L-shaped retaining element are all formed of a polymer.

14. The protective device for a cable according to claim 12, wherein the L-shaped retaining element connected to at least one of the opposed sidewalls is connected with a living hinge.

15. The protective device for a cable according to claim 14, wherein the end of the L-shaped retaining element comprising the locking element locks with a corresponding locking element on a second one of the opposed sidewalls.

16. The protective device according to claim 12, wherein the opposed sidewalls, the floor, and the L-shaped retaining element are formed of a single, continuous polymer.

17. The protective device according to claim 12, wherein the polymer is one selected from the group consisting of polypropylene and polyethylene.

* * * * *